Figure 1:
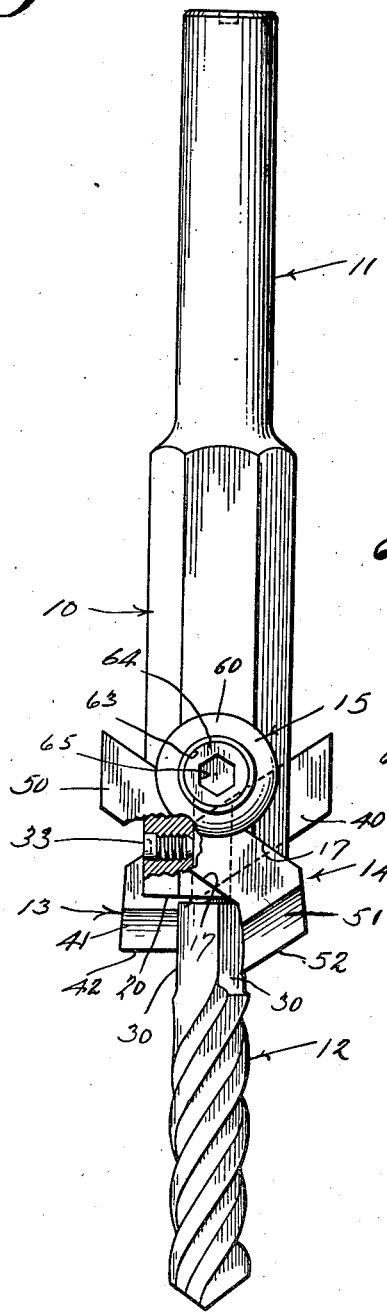

Sept. 23, 1947.                L. A. SMITH                 2,427,816
                                  TOOL
                            Filed May 8, 1944

INVENTOR.
Lawson A. Smith
BY
ATTORNEY

Patented Sept. 23, 1947

2,427,816

UNITED STATES PATENT OFFICE 2,427,816

TOOL

Lawson A. Smith, Los Angeles, Calif., assignor to Robert H. Clark, Los Angeles, Calif.

Application May 8, 1944, Serial No. 534,655

3 Claims. (Cl. 77—66)

This invention has to do with a tool and it is a general object of the invention to provide a tool which performs in one operation several functions that are now ordinarily performed by separate and distinct tools.

There are various situations requiring what is known as spot facing at the region of a bore and in some cases both spot facing and counterboring are desirable in such a location. In accordance with present practice a hole is bored by one tool, usually the ordinary drill, then a spot facer is operated to finish or dress a region at the end of the bore and if countersinking is desired the spot facing is followed by a countersinking operation. These several operations performed separately consume considerable time and involve handling of the work which is often costly.

It is a general object of my present invention to provide a tool which combines piloting or possibly drilling means, spot facing means and also countersinking means, with the result that the tool will, in one operation, pilot or drill and also spot face and countersink.

Another object of my invention is to provide a tool of the general character hereinabove referred to in which the spot facing means and countersinking means are independently adjustable and can, if desired, be removed independently of each other so the tool will either spot face or counterbore and perform each function effectively and efficiently.

Another object of the invention is to provide a tool of the general character above referred to in which the spot facing means and the counterboring means are related substantially diametrically opposite each other so that the tool is balanced and has a substantially balanced action when in operation.

Another object of the present invention is to provide a tool of the general character referred to in which the cutting means, that is, the spot facing means and counterboring means, overlap or project inwardly beyond the path of the drill or pilot so that the resulting work is without burrs or ragged edges.

Another object of the present invention is to provide a tool of the general character referred to embodying a simplified and improved means for securing a cutting blade to a shank. By my improved construction the head of the retaining screw is countersunk in the clamp washer so that the two are, in effect, telescoped together, thus materially reducing the over-all height and the consequent diameter of the tool.

Figure 2:
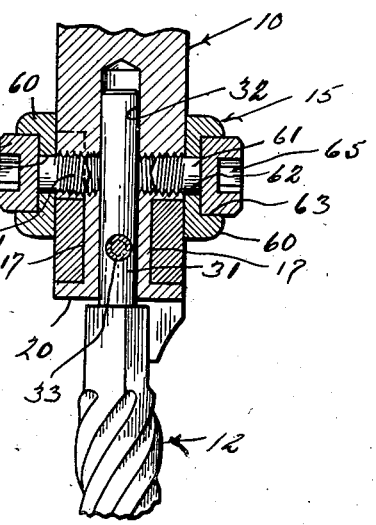

The various objects and features of my invention will be fully understood from the following detailed description of a typical preferred form and application of the invention, throughout which description reference is made to the accompanying drawings, in which:

Fig. 1 is a side view of a tool embodying my present invention showing it equipped with a drill, with a spot facing tool, and a counterboring tool, and with a part broken away to show the manner in which the drill is retained in place. Fig. 2 is a detailed sectional view through the construction showing the manner in which the cutting tools are retained on the shank.

The tool provided by my present invention involves, generally, a body 10, a shank 11, a pilot or drill 12, a spot facing cutter 13, a counterbore cutter 14, and a means 15 for clamping the means 13 and 14 in place relative to the body.

The body 10 is an elongate member preferably hexagonal in cross sectional configuration and has diametrically opposite pitched channels 17 cut in opposite sides near its lower end to carry the means 13 and 14. The channels are pitched as is indicated in the drawings so that the means 13 and 14 are carried so that they pitch to have their active or cutting ends at opposite sides of the axis of the tool a suitable distance beyond the lower end 20 of the body.

The shank 11 is provided to facilitate mounting the tool in a suitable machine and in the particular case illustrated the shank is a straight turned shank continuing from the upper end of the body 10.

If the tool of the present invention is to be used where a hole has been initially drilled or formed a plain pilot may be provided to project from the lower end of the body 10. However, the tool may be used to initially drill a hole, in which case a drill 12 is provided to project from the lower end of the body and, in practice, a drill may be used even where a hole has been initially formed. The particular drill illustrated is of the type known as a twist drill. The drill preferably has flattened sides 30 at its upper end to occur immediately below the lower end 20 of the body 10 and a shank portion 31 projects upwardly from the flattened portion to enter a central socket 32 extending inwardly from the bottom end of the body. A set screw 33 may be provided for retaining the shank 31 in the socket 32.

The spot facing means includes a cutting tool having a shank or body portion 40 that fits or is received in one of the diagonally disposed channels 17 formed in the body 10. The lower end portion 41 of the shank 40 is dressed in the form of a cutter and has a cutting edge 42 disposed horizontally or at right angles to the longitudinal axis of the tool and extends from a point immediately adjacent one of the flattened sides 30 of the drill to a point a suitable distance radially beyond or outward of the drill. The length or extent of the cutting edge 42 may be varied and will determine the extent of the spot facing performed by the tool.

The counterboring means 14 involves a cutting tool that has a shank portion 50 carried in the other channel 17 in the body and the lower end portion 51 of the shank 50 is shaped or formed as a cutter and has a cutting edge 52 diagonally disposed to have the desired counterboring action. It will be understood of course that the cutter parts 41 and 51 are dressed and shaped so that their edges 42 and 52 both face or are active in the same direction so that they cut in the same direction as the tool is operated. The cutting part 51 is shaped and proportioned so that it normally extends from a point immediately adjacent one of the flat sides 30 of the drill outwardly and upwardly at the desired angle so that its edge 52 overlaps the cut of the drill and forms a counterbore at the desired angle. It will be apparent that by adjusting the shank 50 lengthwise in its supporting channel 17 the relationship of the cut made by the edge 52 is varied relative to the cut made by the edge 42 so that the resulting counterbore may be varied relative to the spot facing.

If it is desired to use the tool only as a spot facer the means 14 can be removed, whereas if it is desired only to counterbore, then the means 13 can be removed.

The means 15 provided by my invention for retaining the cutting means in position on the body 10 involves clamp plates 60 which are secured to the sides of the body that are channeled so that they overhang the shanks of the cutting means. The plates 60 are clamped to the shanks of the cutting parts by means of screws 61 threaded into openings provided in the body adjacent the channels. In accordance with the invention each plate 60 has an opening 62 to pass the screw which retains it and is counterbored at 63 to receive the head 64 of the screw. I prefer to use a screw which has a head round in cross section and provided with a socket 65 for the reception of a wrench, or the like. Through this construction the head of the screw is countersunk into the plate 60 so that the combined structure is compact and does not project an objectionable distance from the body. This is an important feature and is highly desirable in situations where the tool must operate in a limited space.

Having described only a typical preferred form and application of my invention, I do not wish to be limited or restricted to the specific details herein set forth, but wish to reserve to myself any variations or modifications that may appear to those skilled in the art, or fall within the scope of the following claims:

Having described my invention, I claim:

1. A tool of the character described including a body, a member carried by the body to project centrally from its lower end and having diametrically opposite flattened sides adjacent the lower end of the body, a spot facing cutter carried by the body, and a counterboring cutter carried by the body, the cutters being located to project from points adjacent the flattened sides of said member outwardly to points laterally removed from said member.

2. A tool of the character described including, a body, a member carried by the body to project from its lower end to enter an opening in an object to be cut and having opposite sides flattened adjacent the end of the body, two cutters, means independently attaching the cutters to the body so their active portions are at the lower end of the body and project from points immediately adjacent the flattened sides of the said member, the cutters having cutting edges which are angularly related to each other and make cuts in said object which intersect as the tool operates and one of which extends to the said opening.

3. A tool of the character described including, a centering member, a cutter, a body directly supporting the centering member and having an inclined channel opening extending into it from one side to receive and hold the cutter and having a tapped bore extending into it from said side adjacent said channel opening, and means for securing the cutter in the channel opening of the body including, a clamp plate having a clamp face directly opposed to the bottom of the opening and overlying and bearing on the outer side of the cutter at a point where it is held in the opening and a headed screw threaded into said bore in the body and bearing on the plate, the plate having a countersunk opening in its outer side receiving the head of the screw.

LAWSON A. SMITH.

REFERENCES CITED

The following references are of record in the file of this patent:

UNITED STATES PATENTS

| Number | Name | Date |
|---|---|---|
| 687,724 | Cadell | Dec. 3, 1901 |
| 1,502,652 | Babcock | July 29, 1924 |
| 1,622,094 | Decker | Mar. 22, 1927 |
| 2,057,769 | Dowling et al. | Oct. 20, 1936 |
| 2,226,762 | Frey | Dec. 31, 1940 |
| 643,260 | Tynan | Feb. 13, 1900 |
| 2,358,608 | Turner | Sept. 19, 1944 |
| 1,409,673 | Colby | Mar. 14, 1922 |

FOREIGN PATENTS

| Number | Country | Date |
|---|---|---|
| 346,689 | Germany | Jan. 6, 1922 |